(12) United States Patent
Koga

(10) Patent No.: US 9,172,280 B2
(45) Date of Patent: Oct. 27, 2015

(54) CONDUCTOR AND ROTATING ELECTRICAL MACHINE WITH A COVERING MATERIAL

(71) Applicant: Kiyotaka Koga, Nishio (JP)

(72) Inventor: Kiyotaka Koga, Nishio (JP)

(73) Assignee: AISIN AW CO., LTD., Anjo (JP)

( * ) Notice: Subject to any disclaimer, the term of this patent is extended or adjusted under 35 U.S.C. 154(b) by 266 days.

(21) Appl. No.: 13/647,874

(22) Filed: Oct. 9, 2012

(65) Prior Publication Data

US 2013/0127289 A1 May 23, 2013

(30) Foreign Application Priority Data

Nov. 21, 2011 (JP) .................................. 2011-254147

(51) Int. Cl.
*H02K 3/34* (2006.01)
*H02K 3/12* (2006.01)
*H01F 5/00* (2006.01)
*H01F 5/06* (2006.01)
*H02K 15/09* (2006.01)

(52) U.S. Cl.
CPC .. *H02K 3/12* (2013.01); *H01F 5/00* (2013.01); *H01F 5/06* (2013.01); *H02K 3/34* (2013.01)

(58) Field of Classification Search
CPC ............. H02K 3/04; H02K 3/32; H02K 3/34; H02K 3/345; H02K 15/085; H02K 15/09
USPC .......................................... 310/208, 214, 215
See application file for complete search history.

(56) References Cited

U.S. PATENT DOCUMENTS

2011/0198962 A1* 8/2011 Tang .............................. 310/198

FOREIGN PATENT DOCUMENTS

| EP | 0408230 A2 | 1/1991 | | |
|----|-----------|--------|---|---|
| JP | A-59-96605 | 6/1984 | | |
| JP | H03-52205 A | 3/1991 | | |
| JP | A-9-9588 | 1/1997 | | |
| JP | A-9-121488 | 5/1997 | | |
| JP | A-2002-358840 | 12/2002 | | |
| JP | A-2004-194435 | 7/2004 | | |
| JP | A-2007-227263 | 9/2007 | | |
| JP | 2008193860 A | * 8/2008 | ............... | H02K 3/34 |
| JP | A-2008-193860 | 8/2008 | | |
| JP | 2011091943 A | * 5/2011 | ............... | H02K 3/18 |
| JP | A-2011-91943 | 5/2011 | | |

OTHER PUBLICATIONS

Machine translation of JP 2011091943 A (May 2011).*
Machine translation of JP 2008193860 A (Aug. 2008).*
Dec. 25, 2012 International Search Report issued in International Patent Application No. PCT/JP2012/076321; with English-language translation.

* cited by examiner

*Primary Examiner* — Michael Andrews
(74) *Attorney, Agent, or Firm* — Oliff PLC

(57) ABSTRACT

A conductor for a coil of a rotating electrical machine that includes a conductor wire bundle formed by gathering a plurality of conductor wires and a flexible insulating covering material that covers a periphery of the conductor wire bundle. The conductor has an intra-covering gap formed inward of the insulating covering material in a radial direction so that the conductor wires can move relative to each other in the intra-covering gap, and a cross-sectional shape of the insulating covering material along a perpendicular plane that is perpendicular to an extending direction in which the conductor wire bundle extends can be deformed.

13 Claims, 5 Drawing Sheets

CONDUCTOR AND ROTATING ELECTRICAL MACHINE WITH A COVERING MATERIAL

INCORPORATION BY REFERENCE

The disclosure of Japanese Patent Application No. 2011-254147 filed on Nov. 21, 2011 including the specification, drawings and abstract is incorporated herein by reference in its entirety.

BACKGROUND OF THE INVENTION

The present invention relates to conductors for coils of rotating electrical machines, and rotating electrical machines including the conductors.

DESCRIPTION OF THE RELATED ART

A stator included in a rotating electrical machine as an electric motor or an electric generator is formed by attaching a coil to a stator core having a plurality of slots. A rotor included in the rotating electrical machine can similarly be formed by attaching a coil to a rotor core having a plurality of slots. For example, Japanese Patent Application Publication No. H09-009588 (JP H09-009588 A) describes a stator including a coil formed by winding conductor wires having a circular cross section many times in a plurality of slots distributed in the circumferential direction of a stator core. That is, the rotating electrical machine of JP H09-009588 A includes a conductor formed by gathering the plurality of conductor wires having a circular cross section.

As described above, in the conductor formed by using the conductor wires having a circular cross section, a gap tends to be formed between the conductor wires in each slot when the conductor is attached to the stator, and it is difficult to increase the ratio of the area occupied by the coil. In order to reduce the gap between the conductor wires to increase the ratio of the area occupied by the coil, it is also effective to reduce the diameter of the conductor wires. However, reducing the diameter of the conductor wires has problems. For example, measures need be taken to prevent disconnection of the conductor wires when winding the conductor on the core (the stator core or the rotor core). Moreover, the number of windings on the core is increased, and the time required for the winding process is increased. In order to increase the ratio of the area occupied by the coil, it is effective to form the coil by using conductor wires having a rectangular cross section. However, the slot shape is also limited to a substantially rectangular shape corresponding to the cross-sectional shape of the conductor wires, and the slots or teeth can not necessarily have an optimal shape.

Japanese Patent Application Publication No. 2011-091943 (JP 2011-091943 A) describes that a coil is formed by using a conductor that has a deformable insulator on the outer periphery of a conductor bundle formed by bundling a plurality of conductor wires. According to JP 2011-091943 A, the shape of the conductor bundle (the cross-sectional shape of the conductor) can be changed into any shape, whereby the gap between the conductors can be reduced and the ratio of the area occupied by the coil can be increased. However, it can be seen from FIGS. 5 to 9 of JP 2011-091943 A that, in order to make the cross-sectional shape of the conductor freely deformable, the insulator covering the outer periphery of the conductor bundle need be made of a material having relatively high elasticity. That is, the ratio of the area occupied by the coil can not necessarily be increased depending on the material of the insulator of the conductor.

SUMMARY OF THE INVENTION

Thus, it is desired to implement a conductor capable of simplifying a winding process on a core and capable of increasing the ratio of the area occupied by a coil regardless of the material of a constituent member and the slot shape.

According to a first aspect of the present invention, a conductor for a coil of a rotating electrical machine includes: a conductor wire bundle formed by gathering a plurality of conductor wires; and a flexible insulating covering material that covers a periphery of the conductor wire bundle. The conductor has an intra-covering gap formed inward of the insulating covering material in a radial direction so that the conductor wires can move relative to each other in the intra-covering gap. In the conductor, a cross-sectional shape of the insulating covering material along a perpendicular plane that is perpendicular to an extending direction in which the conductor wire bundle extends can be deformed.

As used herein, the term "periphery of the conductor wire bundle" refers to the periphery of a cross section of the conductor wire bundle along the perpendicular plane. The term "intra-covering gap" refers to a gap formed inside the insulating covering material so that the conductor wires can move relative to each other in a region radially inward of the insulating covering material. The term "intra-covering gap" does not includes a gap formed between the conductor wires that are closely in contact with each other and thus cannot move relative to each other, and a gap formed between the insulating covering material and the conductor wires that are closely in contact with each other and thus cannot move relative to each other. The term "rotating electrical machine" is used as a concept including a motor (an electric motor), a generator (an electric generator), and a motor-generator that functions both as the motor and the generator as required.

In the above configuration, the insulating covering material is flexible, and the intra-covering gap is present radially inward of the insulating covering material. Thus, the conductor wires can move relative to each other in the intra-covering gap. Accordingly, the cross-sectional shape of the conductor along the perpendicular plane can be relatively freely deformed, even if the insulating covering material does not have high elasticity. This facilitates insertion of the conductor into the slot regardless of the width of the slot opening, when using the conductor for the coil of the rotating electrical machine and attaching the conductor on a core. Moreover, since the conductor is formed by bundling the plurality of conductor wires, the number of windings on the core can be reduced and the ratio of the area occupied by the coil can be increased by using the thin conductor wires, whereby efficiency of the winding process of the conductor can be increased. Moreover, since the conductor wire bundle is covered by the insulating covering material, damage to the conductor wires can be suppressed when inserting the conductor into the slot, and an insulating property can be easily ensured. After inserted into the slot, the conductor is arranged so that adjoining ones of the conductors contact each other. Thus, the gap between the plurality of conductors can be reduced, and the conductors can be deformed according to the slot shape, whereby the gap between the inner wall surface of the slot and the conductors can be reduced. Accordingly, the ratio of the area occupied by the coil can be increased. In the above configuration, the conductor can be implemented which is capable of simplifying the winding process on the core and capable of increasing the ratio of the area occupied by the coil regardless of the material of the constituent member (the insulating covering material) and the slot shape.

In the configuration according to the first aspect, in a cross section along the perpendicular plane, a smallest diameter of an imaginary circumscribed circle circumscribing the conductor wire bundle in which adjoining ones of the conductor wires are in contact with each other may be smaller than a true circle inner diameter that is an inner diameter of the insulating covering material deformed to a true circle.

In the above configuration, a predetermined gap space is formed between: an imaginary outer peripheral surface of the conductor wires in the state where adjoining ones of the conductor wires are in contact with each other and the conductor wires are packed in a central portion; and an inner surface of the insulating covering material in the state where the insulating covering material is deformed to the true circle. Thus, the intra-covering gap can be formed appropriately.

In the configuration according to the first aspect, a difference between the smallest diameter of the imaginary circumscribed circle and the true circle inner diameter of the insulating covering material may be equal to or larger than a diameter of the conductor wires.

In the above configuration, a gap corresponding to at least one conductor wire is ensured, whereby the intra-covering gap having a significant size can be formed appropriately and reliably.

In the configuration according to the first aspect, a perimeter of an inner surface of the insulating covering material may be equal to or less than a perimeter of an elongated circle circumscribing the conductor wire bundle having all the conductor wires being arranged in line and in contact with each other.

As used herein, the term "elongated circle" refers to the shape formed by combining two parallel straight lines facing each other and two circular arcs facing each other.

A circumscribed curve circumscribing the conductor wire bundle has the largest perimeter when all the conductor wires are arranged in line and in contact with each other. Thus, making the perimeter of the inner surface of the insulating covering material equal to the perimeter of such a circumscribed curve can ensure the maximum flexibility of deformation of the conductor. Making the perimeter of the inner surface of the insulating covering material longer than the perimeter of such a circumscribed curve of the conductor wire bundle is not appropriate because it merely unnecessarily increases the size of the intra-covering gap. Thus, the perimeter of the insulating covering material can be appropriately set by setting the perimeter of the inner surface of the insulating covering material within a range equal to or less than the perimeter of such a circumscribed curve of the conductor wire bundle.

In the configuration according to the first aspect, the conductor may be wound on a stator core or a rotor core which has a plurality of semi-open slots; the insulating covering material may be deformed by pressing the insulating covering material from both sides of a predetermined reference direction in the radial direction of the insulating covering material, whereby the intra-covering gap is eliminated and all the conductor wires and the insulating covering material are packed as a whole into a packed state; and a diameter of the insulating covering material in the true circle state may be larger than a slot opening width that is a width of a slot opening between adjoining teeth, and a width in the reference direction of the insulating covering material in the packed state may be equal to or less than the slot opening width.

Note that the term "semi-open slots" refers to the slots in which the width of a slot opening that opens in the radial direction of the stator core or the rotor core is narrower than the width of the portion located deeper than the slot opening in the slot.

In the above configuration, the width direction of the slot opening is made to match the direction (the reference direction) in which the insulating covering material is pressed in the packed state where the conductor wires and the insulating covering material are packed as a whole, whereby the conductor can pass through the slot opening. Accordingly, the conductor can be inserted into the slot even if the slot is a semi-open slot.

In the configuration according to the first aspect, the width in the reference direction of the insulating covering material in the packed state may match the slot opening width.

Note that the term "match" is a concept indicating that elements to be compared are substantially the same, and includes the state where the elements have a difference due to an allowable manufacturing error.

In the above configuration, the intra-covering gap has the minimum required size. Thus, the conductor can be inserted in the semi-open slot, and the size of the intra-covering gap is not unnecessarily increased, whereby reduction in the ratio of the area occupied by the coil can be suppressed.

In the configuration according to the first aspect, the conductor wire bundle and the insulating covering material may be in a non-bonded state.

Note that the term "bonded state" refers to the state where two objects contacting each other are physically fixed together. Thus, the term "non-bonded state" refers to the state where two objects are not in contact with each other or are in contact with each other without being physically fixed together.

In the above configuration, the intra-coating gap can also be formed between the conductor wire bundle and the insulating coating material. Thus, not only the conductor materials can move relative to each other, but also the conductor wires and the insulating covering material can move relative to each other, whereby the cross-sectional shape of the conductor along the perpendicular plane can be deformed more freely.

In the configuration according to the first aspect, the conductor wires may be bare wires.

The term "bare wires" refers to conductor wires whose surfaces are not covered by an insulator and are exposed. Thus, the bare wires do not include conductor wires whose surfaces are covered by or coated with an electrically insulating material such as a resin. The bare wires include conductor wires having an oxide film formed on their surfaces.

In the above configuration, the sum of the cross-sectional areas of conductor portions of the conductor wires in the overall cross-sectional area of the conductor wires can be easily increased, compared to the case where the conductor wires have their surfaces covered by or coated with an insulator, for example. Thus, the density of the conductor portions in the slot can be increased, and the ratio of the area occupied by the coil can be easily increased.

According to a second aspect of the present invention, a rotating electrical machine includes in a slot a coil formed of the conductor laving any of the various configurations described above.

In the above configuration, it is possible to implement the rotating electrical machine capable of simplifying the process of winding the conductor on the core and capable of increasing the ratio of the area occupied by the coil regardless of the material of the constituent member (the insulating covering material) of the conductor and the slot shape, by using any of the conductors of the various configurations described above.

DETAILED DESCRIPTION OF THE EMBODIMENTS

Figure 3:
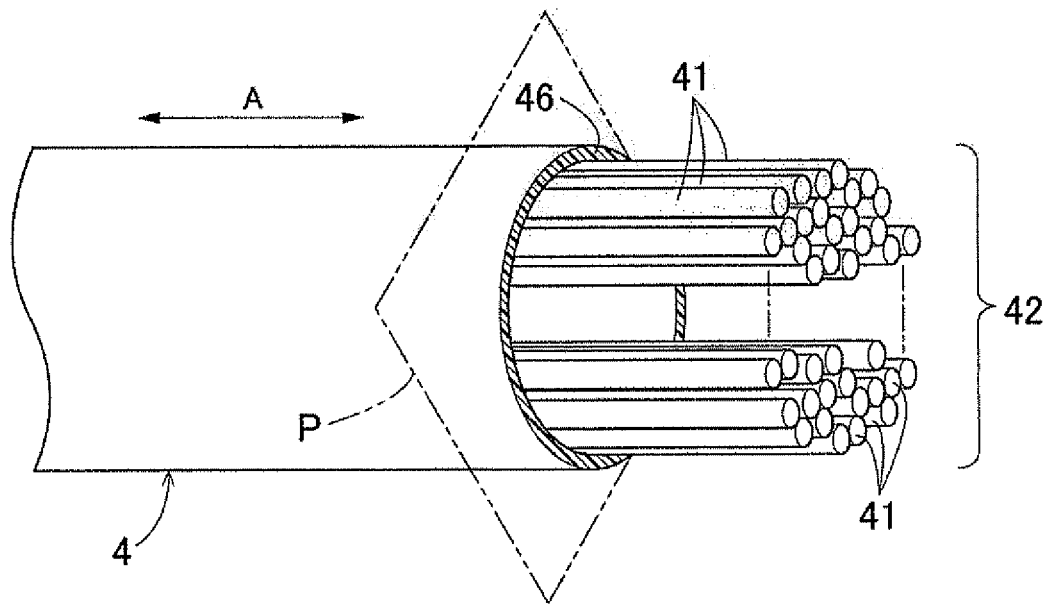
FIG. 3 is a perspective view showing the structure of a conductor.

An embodiment of a conductor and a rotating electrical machine including the conductor according to the present invention will be described below with reference to the accompanying drawings. An example will be described below in which the conductor according to the present invention is applied to a coil 3 of an inner rotor rotating electrical machine 100. As shown in FIG. 3, a conductor 4 for the coil 3 includes a conductor wire bundle 42 formed by gathering a plurality of conductor wires 41, and a flexible insulating covering material 46 covering the periphery of the conductor wire bundle 42. That is, the conductor 4 is structured so that the periphery of the conductor wire bundle 42 formed by gathering the plurality of conductor wires 41 is covered by the flexible insulating covering material 46. The conductor 4 according to the present embodiment is characterized by its inner structure, and the rotating electrical machine 100 is characterized by using such a conductor 4. The overall configuration of the rotating electrical machine 100, the configuration of the conductor 4, the arrangement and configuration of the conductor 4 on a stator core 2, and the manufacturing method of the rotating electrical machine 100 will be sequentially described in detail below.

In the following description, the "axial direction L," the "circumferential direction C," and the "radial direction R" are defined based on the central axis of a cylindrical core reference surface 21 of the stator core 2 described below (e.g., the inner peripheral surface of the stator core 2) unless otherwise specified.

1. Overall Configuration of Rotating Electrical Machine

Figure 1:
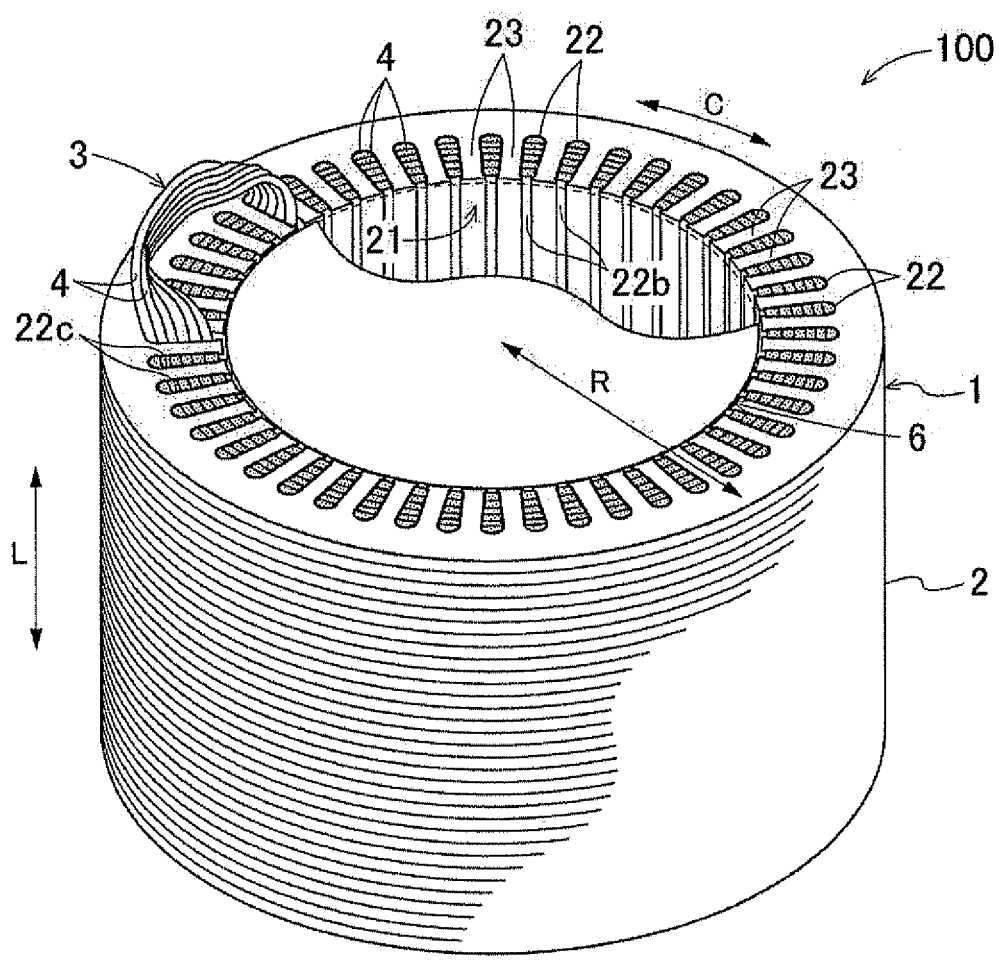
FIG. 1 is a perspective view of a rotating electrical machine according to an embodiment.

The overall configuration of the rotating electrical machine 100 according to the present embodiment will be described with reference to the drawings. As shown in FIG. 1, the rotating electrical machine 100 includes a stator 1 and a rotor 6 rotatably provided inward of the stator 1 in the radial direction R. The stator 1 includes the stator core 2 and the coil 3 attached to the stator core 2, and the coil 3 is formed by winding the conductor 4 on the stator core 2. Regarding a coil end portion as a part of the coil 3 which protrudes from the stator core 2 in the axial direction L, FIG. 1 shows only a part of the coil end portion which protrudes from a pair of slots 22, and does not show the remaining part of the coil end portion, in order to avoid complexity. In FIG. 1, a plurality of conductors 4 forming the coil 3 appear in cross section at the ends of the remaining slots 22 in the axial direction L. The rotor 6 is shown partially cut away in FIG. 1.

The stator core 2 is formed by using a magnetic material. The stator core 2 is a stacked structure formed by stacking a plurality of annular plate-like electromagnetic steel sheets, for example. Alternatively, the stator core 2 can be formed of, as a main component, a compact powder material formed by press-forming powder of a magnetic material. The stator core 2 has a plurality of slots 22 so that the coil 3 can be wound around them. The plurality of slots 22 extend in the axial direction L of the cylindrical core reference surface 21 of the stator core 2, and are distributed in the circumferential direction C of the core reference surface 21. The plurality of slots 22 are formed so as to extend in the radial direction R in a radial pattern from the central axis of the stator core 2. The "cylindrical core reference surface 21" is an imaginary surface that is used as a reference regarding the arrangement and configuration of the slots 22. In the present embodiment, as shown in FIG. 1, the core reference surface 21 is a core inner peripheral surface that is an imaginary cylindrical surface including the inner end faces in the radial direction R of a plurality of teeth 23 each formed between adjoining two of the slots 22. The "cylindrical core reference surface 21" in the present invention may be a cylindrical surface (including an imaginary surface) which is concentric with the cylindrical core inner peripheral surface and whose cross-sectional shape as viewed in the axial direction L (in the case where the cylindrical surface is viewed in the axial direction L) is similar to the cross-sectional shape of the core inner peripheral surface as viewed in the axial direction L. In the present embodiment, since the stator core 2 has a cylindrical shape as shown in FIG. 1, the "cylindrical core reference surface 21" may be the outer peripheral surface of the stator core 2, for example.

Figure 2:
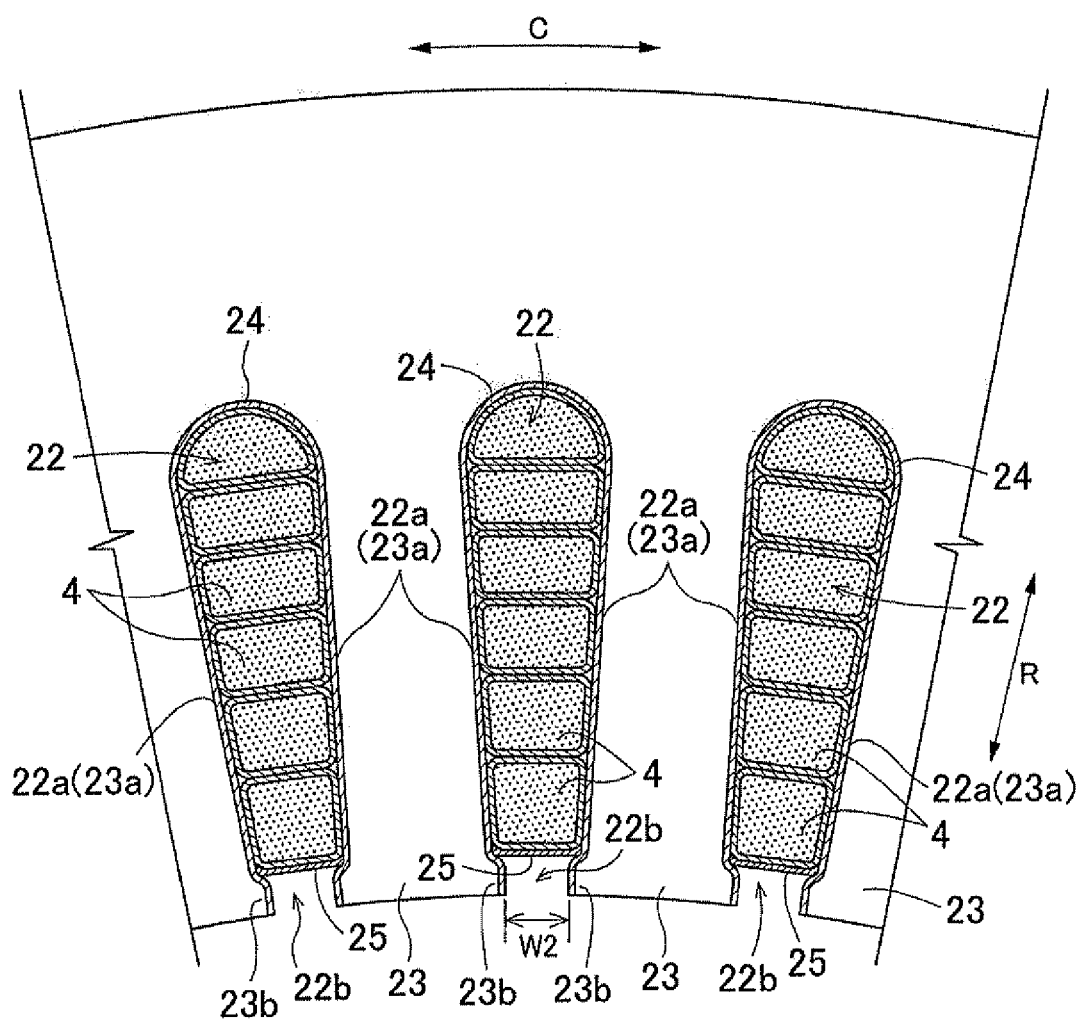
FIG. 2 is a partial enlarged sectional view of a stator.

The stator core 2 has the plurality of slots 22 distributed at regular intervals in the circumferential direction C. The plurality of slots 22 have the same shape. The stator core 2 further has the plurality of teeth 23 each formed between adjoining two of the slots 22. In the present embodiment, the slots 22 are formed in the shape of a groove extending in the axial direction L and the radial direction R and having a predetermined width in the circumferential direction C. In the present embodiment, as shown in FIG. 2, since each tooth 23 is a parallel tooth whose two side surfaces 23a facing the circumferential direction C are parallel to each other, each slot 22 is formed so that the width in the circumferential direction C gradually increases toward the outside in the radial direction R. Thus, an inner wall surface 22a of each slot 22 has two flat surfaces facing each other in the circumferential direction C and formed so that the interval therebetween increases toward the outside in the radial direction R, and a surface having an arc-shaped cross section and formed outward of the two flat surfaces in the radial direction R so as to extend in the axial direction L. Each slot 22 is formed so as to have a radial opening 22b that opens inward in the radial direction R (opens in the inner peripheral surface of the stator core 2), and an axial opening 22c that opens on both sides in the axial direction L (axial end faces) of the stator core 2. A slot insulating portion 24 is provided on the inner wall surface 22a of the slot 22. In the present embodiment, the entire inner wall surface 22a is coated with insulating powder, and the slot insulating portion 24 is formed of the coating film of the insulating powder.

Each tooth 23 is formed between two of the slots 22 which adjoin each other in the circumferential direction C in the stator core 2. In the present embodiment, each tooth 23 is formed so that its two side surfaces 23a facing the circumferential direction C (hereinafter simply referred to as the "tooth side surfaces 23a") are parallel to each other. That is, the stator core 2 in the present embodiment includes parallel teeth. In this example, each tooth 23 has a circumferential protruding portion 23b that is formed at the tip end of the tooth 23 so as to protrude in the circumferential direction C with respect to the remaining part of the tooth side surfaces 23a. Thus, the two tooth side surfaces 23a are formed so that large parts of the tooth side surfaces 23a, namely the tooth side surfaces 23a excluding stepped portions forming the circumferential protruding portion 23b, are parallel to each other. As can be seen from FIG. 2, the two tooth side surfaces 23a are disposed parallel to the radial direction R.

As described above, each tooth 23 has the circumferential protruding portion 23b at its tip end. Thus, the opening width W2 of the radial opening 22b of each slot 22 is narrower than the width of the portion located deeper than the radial opening 22b (outward of the radial opening 22b in the radial direction R) in the slot 22. In this example, the opening width W2 of the radial opening 22b is the width of the radial opening 22b in the circumferential direction C, namely, the width in the direction perpendicular to the radial direction R. As shown in the cross section of FIG. 2, the opening width W2 is the width of the radial opening 22b in a plane perpendicular to the axial direction L of the stator 1. In each slot 22, the opening width W2 of the radial opening 22b is narrower than the width of a portion of the slot 22 where the coil 3 is disposed in the circumferential direction C. Thus, the stator core 2 according to the present embodiment has the semi-open slots 22. In the present embodiment, the radial opening 22b corresponds to the "slot opening" in the present invention, and the opening width W2 of the radial opening 22b corresponds to the "slot opening width" in the present invention.

In the present embodiment, the rotating electrical machine 100 is a three-phase alternating current (AC) electric motor or a three-phase AC electric generator that is driven by a three-phase alternating current (U-phase, V-phase, and W-phase). Thus, the coil 3 of the stator 1 is divided into a U-phase coil, a V-phase coil, and a W-phase coil corresponding to the three phases (U-phase, V-phase, and W-phase), respectively. Accordingly, the slots 22 for U-phase, V-phase, and W-phase are arranged in a repeated pattern of U-phase, V-phase, and W-phase in the circumferential direction C in the stator core 2. In this example, the slots 22 for U-phase, V-phase, and W-phase are arranged in a repeated pattern of two slots for U-phase in which the U-phase coil is inserted, two slots for V-phase in which the V-phase coil is inserted, and two slots for W-phase in which the W-phase coil is inserted, in this order in the circumferential direction C, so that the number of slots per pole per phase is "2". The number of slots per pole per phase can be changed as appropriate, and may be, for example, "1," "3," etc. The number of phases of an AC power source that drives the rotating electrical machine 100 can also be changed as appropriate, and may be, for example, "1," "2," "4," etc.

The coil 3 is formed by winding the conductor 4 on the stator core 2. Various known methods can be used to wind the conductor 4 on the stator core 2. For example, the coil 3 can be formed by winding the conductor 4 on the stator core 2 by a combination of one of lap winding and wave winding and one of concentrated winding and distributed winding.

The rotor 6 serving as a field magnet and including a permanent magnet or an electromagnet (not shown) is disposed inward of the stator 1 (the stator core 2) serving as an armature in the radial direction R so as to be rotatable relative to the stator 1. The rotor 6 is rotated by a rotating field that is generated by the stator 1. That is, the rotating electrical machine 100 according to the present embodiment is an inner rotor rotating field rotating electrical machine.

2. Configuration of Conductor

The conductor 4 forming the coil 3 will be described below. The conductor 4 is a conductor forming the coil 3 of each phase, and the coil 3 is formed by winding the conductor 4 on the stator core 2. As shown in FIG. 3, the conductor 4 has the conductor wire bundle 42 formed by gathering, the plurality of conductor wires 41, and the flexible insulating covering material 46 covering the periphery of the conductor wire bundle 42.

Figure 4:
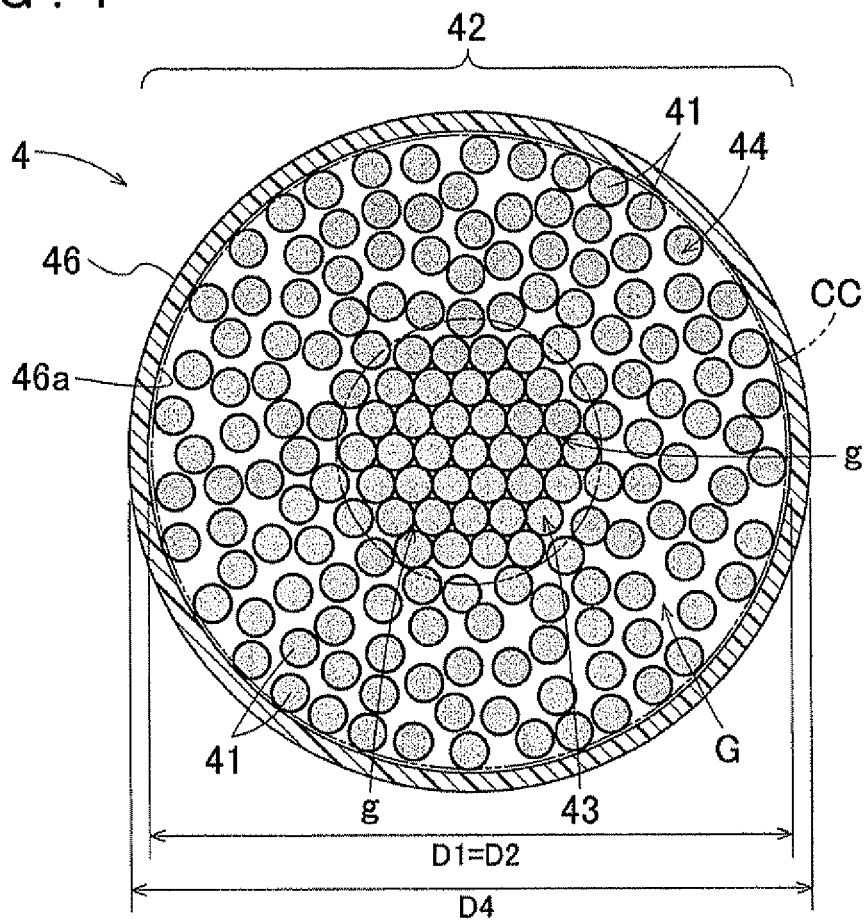
FIG. 4 is a sectional view showing the structure of the conductor.

The conductor wires 41 are linear conductors made of, for example, copper, aluminum, etc. As shown in FIG. 4, in the present embodiment, each conductor wire 41 has a circular cross section in a perpendicular plane (see FIG. 3) as a plane perpendicular to the extending direction A in which the conductor wire 41 extends. Conductor wires having a relatively small diameter are used as the conductor wires 41. For example, conductor wires 41 having a diameter (a wire diameter D3) of 0.2 mm or less are preferably used. In the present embodiment, bare wires are used as the conductor wires 41. That is, in the conductor wires 41 formed of the bare wires, the surfaces of the conductors such as copper or aluminum are not covered by an insulating material, and are exposed. An oxide film that is formed on the conductor surfaces by oxidization may have a weak electrically insulating property. Such an oxide film is not included in the insulating material as used herein. Thus, the conductors having such an oxide film formed on their surfaces are also included in the conductor wires 41 formed of the bare wires. It is also preferable that an insulating film made of an electrically insulating material such as a resin (e.g., a polyamide-imide resin, a polyimide resin, etc.) be formed on the surfaces of the conductor wires 41. Unlike the insulating covering material 46 described below, this insulating film is formed as a film that covers the surface of each conductor wire 41.

The conductor wire bundle 42 is formed by gathering the plurality of conductor wires 41. The number of conductor wires 41 forming the conductor wire bundle 42 is determined by the final thickness (cross-sectional area) of the conductor 4 and the thickness (cross-sectional area) and shape of each conductor wire 41. In the present embodiment, as shown in FIG. 2, the thickness (cross-sectional area) of each conductor 4 is set so that six conductors 4 fill the space in each slot 22, and the thickness (cross-sectional area) of the conductor wire bundle 42, the number of conductor wires 41, the thickness (cross-sectional area) of each conductor wire 41, etc. are set according to the thickness (cross-sectional area) of each conductor 4. As shown in FIG. 3, in the present embodiment, one conductor wire bundle 42 is formed by twisting and bundling the plurality of conductor wires 41.

The insulating covering material 46 is a flexible electrically insulating member, and is provided so as to cover the periphery of the conductor wire bundle 42. As used herein, the periphery of the conductor wire bundle 42 refers to the periphery (the outer periphery) of the cross section of the conductor wire bundle 42 taken along the perpendicular plane P, and does not include the ends of the conductor wire bundle 42 in the extending direction A. That is, the insulating covering material 46 is provided so as to cover the periphery of the conductor wire bundle 42 along its entire circumference and to cover the periphery of the conductor wire bundle 42 along its entire length in the extending direction A except connection portions provided at the ends of the conductor wire bundle 42 in the extending direction A. As used herein, the connection portion refers to the portion that electrically connects one conductor 4 to another conductor 4 or another conductor. The direction in which the conductor wire bundle 42 and the conductor 4 extend is the same as the extending direction A of the conductor wires 41. Thus, the direction in which the conductor wire bundle 42 and the conductor 4 extend is also represented by the same reference character "A".

A flexible, electrically insulating material is used as the insulating covering material 46. For example, various synthetic resins such as a fluororesin, an epoxy resin, and polyphenylene sulfide are used as the insulating covering material 46. As used herein, the term "flexible" refers to a property of a material capable of being bent or curved. The insulating covering material 46 according to the present embodiment need only have elasticity that is high enough to wind the conductor 4 on the stator core 2 by bending or curving the conductor 4, and the elasticity of the insulating covering material 46 does not need to be very high. As used herein, the term "elasticity" refers to a property of a material capable of being stretched and then returned to its original size and shape. In this example, elasticity in the radial direction is not particularly required for the insulating covering material 46. For example, the insulating covering material 46 may be formed by using a material whose perimeter after the material is stretched is 130% or less, particularly 120% or less, or more particularly 110% or less of the perimeter of the material in a true circle state in which the material is not subjected to any external force. In the present embodiment, such an insulating covering material 46 is formed by using a flexible sheet-like material or cylindrical material surrounding the periphery of the conductor wire bundle 42.

The density of the conductor wires 41 disposed radially inward of the insulating covering material 46 (inside the insulating covering material 46) tends to be lower in a radially outer region of the conductor wire bundle 42 than that in a radially inner region thereof. In this example, the conductor wire bundle 42 is divided into two layers according to the density of the conductor wires 41. As shown in FIG. 4, the two layers include a first gathering layer 43 located in the central portion inside the insulating covering layer 46 and a second gathering layer 44 located around the first gathering layer 43.

In the first gathering layer 43, the plurality of conductor wires 41 closely contact each other and gather at a high density. The plurality of conductor wires 41 included in the first gathering layer 43 thus closely contact each other, and thus are less likely to move relative to each other unless an external force is applied. The plurality of conductor wires 41 are less likely to move relative to each other in the radial and circumferential directions of each conductor 4. In the present embodiment, conductor wires having a circular cross section along the perpendicular plane P are used as the conductor wires 41. Thus, inter-wire gaps g are formed between the plurality of conductor wires 41 forming the first gathering layer 43 of the conductor wire bundle 42. Each inter-wire gap g is formed so as to be independently surrounded by the outer surfaces of two or more (e.g., three) of the conductor wires 41 whose peripheries closely contact each other, and to extend in the axial direction L.

In the second gathering layer 44, the plurality of conductor wires 41 are packed to some degree, but do not closely contact each other, and gather at a density lower than that in the first gathering layer 43. An intra-covering gap G that is different from the inter-wire gaps g is formed between the plurality of conductor wires 41 forming the second gathering layer 44 of the conductor wire bundle 42. Such intra-covering gap G is formed as a relatively large gap extending in the axial direction L. The intra-covering gap G is formed in which gaps corresponding to the inter-wire gaps g in the first gathering layer 43 are connected together via spaces each formed between the conductor wires 41 that adjoin each other with a predetermined interval therebetween. In the present embodiment, the conductor wire bundle 42 and the insulating covering material 46 are not completely bonded together, and are in a non-bonded state. Thus, the intra-covering gap G is formed not only between the conductor wires 41 but also between the insulating covering material 46 and the conductor wires 41. The plurality of conductor wires 41 included in the second gathering layer 44 are separated from each other by the intra-covering gap G, and thus easily move relative to each other even if a large external force is not applied. The plurality of conductor wires 41 are capable of moving relative to each other in at least one of the radial and circumferential directions of the conductor 4.

"CC" represents an imaginary circumscribed circle in the cross section along the perpendicular plane P, which circumscribes the conductor wire bundle 42 with adjoining ones of the conductor wires 41 being in contact with each other. As shown in FIG. 4, when the conductor 4 is in a normal state, the diameter of the imaginary circumscribed circle CC (the circumscribed circle diameter D1) matches the inner diameter of the insulating covering material 46 in a true circle state (the true circle inner diameter D2). That is, the relation of "D1=D2" is satisfied. On the other hand, the conductor 4 according to the present embodiment has the intra-covering gap G radially inward of the insulating covering material 46, and the plurality of conductor wires 41 included in the second gathering layer 44 can move relative to each other so as to be packed in the central portion (see FIG. 5). In such case, the circumscribed circle diameter D1 of the imaginary circumscribed circle CC is the smallest (the smallest circumscribed circle diameter D1$n$). As can be seen from FIG. 5, in the cross section along the perpendicular plane P, the smallest circumscribed circle diameter D1$n$ of the imaginary circumscribed circle CC is smaller than the true circle inner diameter D2 of the insulating covering material 46. That is, the relation of "D1$n$<D2" is satisfied.

Figure 5:
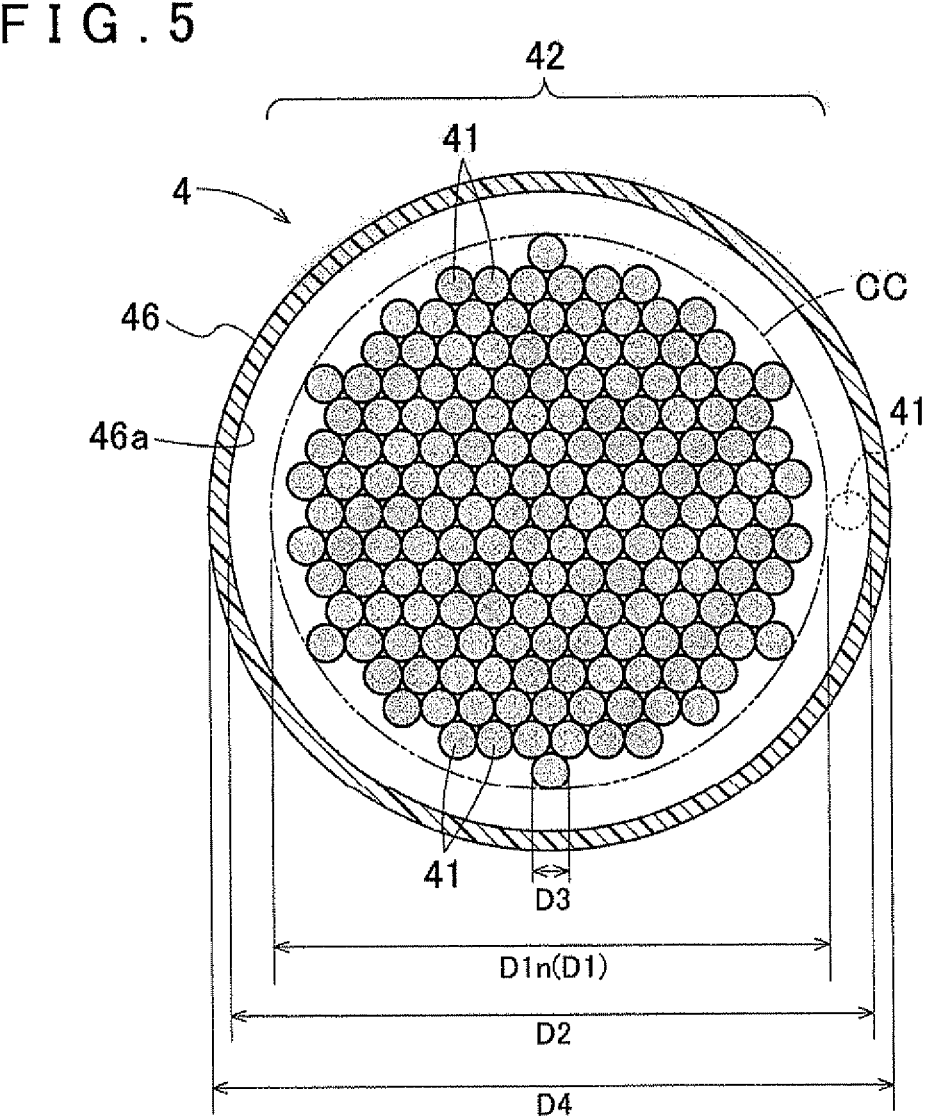
FIG. 5 is a virtual sectional view of the conductor, illustrating an intra-covering gap.

In the present embodiment, the difference between the smallest circumscribed circle diameter D1$n$ of the imaginary circumscribed circle CC and the true circle inner diameter D2 of the insulating covering material 46 is equal to or larger than the wire diameter D3 of the conductor wires 41. That is, the true circle inner diameter D2 of the insulating covering material 46, the smallest circumscribed circle diameter D1$n$ of the imaginary circumscribed circle CC, and the wire diameter D3 are set so that the relation of "D2−D1$n$≥D3" is satisfied. In the example of FIG. 5, the difference between the smallest circumscribed circle radius (D1$n$/2) of the imaginary circumscribed circle CC and the true circle radius (D2/2) of the insulating covering material 46 matches the wire diameter D3 of the conductor wires 41. Accordingly, in this example, the difference between the smallest circumscribed circle diameter D1$n$ of the imaginary circumscribed circle CC and the true circle inner diameter D2 of the insulating covering material 46 is about two times the wire diameter D3 of the conductor wires 41. Since the smallest circumscribed circle diameter D1$n$ of the imaginary circumscribed circle CC is smaller than the true circle inner diameter D2 of the insulating covering material 46 by an amount larger than the wire diameter D3 of the conductor wires 41, the intra-covering gap G having a significant size can be appropriately and reliably formed. In the cross section along the perpendicular plane P, the ratio of the cross-sectional area of the intra-covering gap G to the cross-sectional area inside the insulating covering material 46 (the gap ratio) can be, for example, 5% to 35%, particularly 15% to 30%, etc.

Figure 6:
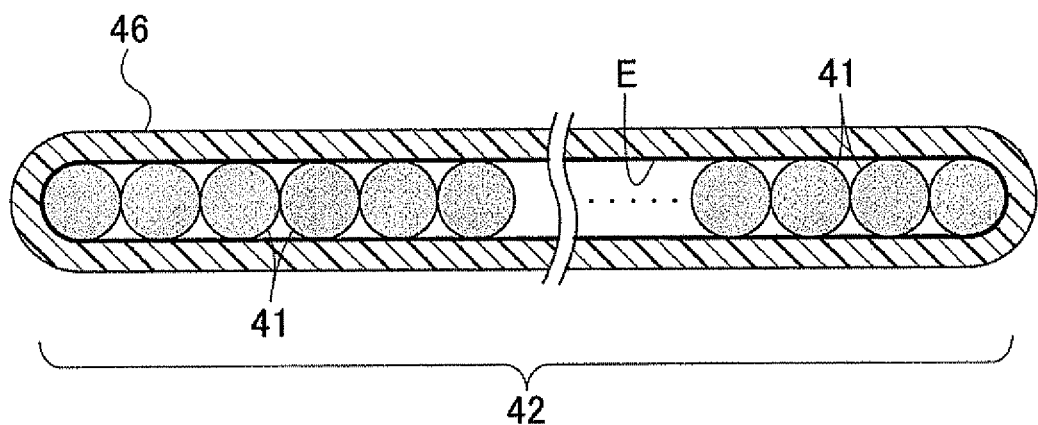
FIG. 6 is a virtual sectional view of the conductor, illustrating the intra-covering gap.

The perimeter of an inner surface 46a of the insulating covering material 46 is preferably equal to or less than the perimeter of an elongated circle (a circumscribed elongated circle) E circumscribing the conductor wire bundle 42 having all the conductor wires 41 being arranged in line and in contact with each other as shown in FIG. 6. The perimeter of the circumscribed elongated circle E becomes the longest when all the conductor wires 41 are arranged in line and in contact with each other. Accordingly, making the perimeter of the inner surface 46a of the insulating covering material 46 equal to the perimeter of such a circumscribed elongated circle E can ensure the maximum flexibility of deformation of the conductor 4. Making the perimeter of the inner surface 46a of the insulating covering material 46 longer than the perimeter of such a circumscribed elongated circle E of the conductor wire bundle 42 is not appropriate because it merely unnecessarily increases the size of the intra-covering gap G. Thus, the perimeter of the insulating covering material 46 can be appropriately set by setting the perimeter of the inner surface 46a of the insulating covering material 46 within a range equal to or less than the perimeter of such a circumscribed elongated circle E of the conductor wire bundle 42. Moreover, the size of the intra-covering gap G can be appropriately set, and the gap ratio described above can be made in a desired range.

As described above, in the conductor 4 according to the present embodiment, the intra-covering gap G is present radially inward of the insulating covering material 46. Thus, the conductor wires 41 can move relative to each other in at least one of the radial and circumferential directions of the conductor 4 in the intra-covering gap G. In particular, when the insulating covering material 46 is in the true circle state, the intra-covering gap G is relatively large, and the conductor wires 41 can easily move relative to each other within the insulating covering material 46. In addition, since the insulating covering material 46 is flexible, the insulating covering material 46 itself can be easily deformed. Thus, the cross-sectional shape along the perpendicular plane P of the conductor 4 (the conductor wire bundle 42 and the insulating covering material 46) can be relatively freely deformed (see FIG. 8). That is, with the deformation of the insulating covering material 46, the conductor wires 41 move relative to each other in the intra-covering gap G located inside the insulating covering material 46, whereby the cross-sectional shape of the conductor 4 can be easily deformed.

In the present embodiment, the outer diameter of the conductor 4 when having a cross-sectional shape of a true circle along the perpendicular plane P (the true circle outer diameter D4) is set to be larger than the opening width W2 of the radial opening 22b of each slot 22. Since the conductor 4 whose true circle outer diameter D4 is larger than the opening width W2 of the radial opening 22b is wound on the stator core 2, the number of windings of the conductor 4 on the stator core 2 can be reduced, and the winding process can be simplified and can be performed more efficiently.

3. Arrangement and Configuration of Conductor on Stator Core

The arrangement and configuration of the conductor 4 according to the present embodiment on the stator core 2 will be described below. As shown in FIG. 2, a plurality of (in this example, six) conductors 4 are arranged in each of the plurality of slots 22 of the stator core 2 such that adjoining ones of the plurality of conductors 4 contact each other. In the present embodiment, all of the plurality of conductors 4 in each slot 22 are arranged in line along the radial direction R at the same position in the circumferential direction C. Thus, the stator 1 has a multilayer winding structure (in this example, a 6-layer winding structure) in which the plurality of conductors 4 are arranged in the radial direction R. Each conductor 4 is linearly arranged in each slot 22 so as to extend along the slot 22 in the extending direction A parallel to the axial direction L.

Only the portion of the conductor 4, which is located in each slot 22, is considered to count the number of conductors 4 arranged in each slot 22. In the present embodiment, a single continuous conductor 4 in the state where it is removed from the stator core 2 is wound six times in the same slot 22 so that six conductors 4 are arranged in each slot 22. It is also preferable that two conductors 4 in the state where they are removed from the stator core 2 be wound three times in the same slot 22 or three conductors 4 in the state where they are removed from the stator core 2 be wound two times in the same slot 22 so that six conductors 4 are arranged in each slot 22. It is also preferable that the six conductors 4 in each slot 22 be six separate conductors in the state where they are removed from the stator core 2. In any case, the coil 3 is formed by winding the conductor 4 on the stator core 2 such that a plurality of (in this example, six) conductors 4 are arranged in each of the plurality of slots 22 in the stator core 2.

As described above, the conductor 4 is configured such that its cross-sectional shape along the perpendicular plane P can be easily deformed. Thus, in each slot 22, the conductor 4 is deformed according to the shape of the slot 22, which can reduce the gap between the plurality of conductors 4 and the gap between the inner wall surface 22a of the slot 22 and the conductors 4, and can increase the ratio of the area occupied by the coil 3. In order to implement the state in which gaps are small, adjoining ones of the conductors 4 are in contact with each other in each slot 22. More specifically, as shown in FIG. 2, each of the plurality of conductors 4 has a contact surface shaped to extend along the contact surface of another conductor 4 adjoining the conductor 4, and these two adjoining conductors 4 surface contact each other along the contact surfaces. In the present embodiment, all of the plurality of conductors 4 arranged in each slot 22 have a portion shaped to extend along the inner wall surface 22a of the slot 22, and surface contact the inner peripheral surface 22a along this portion. That is, each conductor 4 has a contact surface that is parallel to the inner wall surface 22a and that surface contacts the inner peripheral surface 22a.

Each of the plurality of conductors 4 is pressed and deformed in the slot 22 by the inner wall surface 22a or another conductor 4 so that the contact surface of the conductor 4 is formed. In the present embodiment, the plurality of conductors 4 are arranged in each slot 22 while maintaining their shapes formed when the plurality of conductors 4 are pressed from the radial opening 22b side. That is, the plurality of conductors 4 have been deformed with respect to a normal state in which no external force is applied thereto.

The thickness (the cross-sectional area along the perpendicular plane P) of each conductor 4 is set so as to fill the space in each slot 22 with a plurality of (in this example, six) conductors 4. Accordingly, as shown in FIG. 2, with the plurality of conductors 4 being accommodated in the slot 22, each conductor 4 is deformed due to contact with another conductor 4 or contact with the inner wall surface 22a of the slot 22, and the gap between the plurality of conductors 4 and the gap between the inner wall surface 22a of the slot and the conductors 4 are very small. In this state, the overall cross-sectional shape of the plurality of conductors 4 matches the cross-sectional shape of the slot 22 which is perpendicular to the axial direction L.

In the present embodiment, the inner wall surface 22a of each slot 22 has two flat surfaces facing each other so as not to be parallel to each other, and a surface having an arc-shaped cross section and extending in the axial direction L. Arranging a relatively thick linear conductor, having a fixed cross sectional shape in such a slot 22 tends to increase the gap between the linear conductor and the inner wall suffice 22a of the slot 22. However, according to the configuration of the present embodiment, the cross-sectional shape of each conductor 4 is deformed according to the shape of the inner wall surface 22a of the slot 22, whereby the gap between each conductor 4 and the inner wall surface 22a can be easily reduced. Since the cross-sectional shape of each conductor 4 is thus deformed, adjoining ones of the conductors 4 closely contact each other, or each conductor 4 closely contacts the inner wall surface 22a, whereby the gap is reduced. At this time, the cross-sectional shape of each conductor 4 is deformed according to the shape of the inner wall surface 22a, or the conductors 4 whose cross-sectional shapes can be easily deformed are pressed against each other, whereby the cross-sectional shapes of the plurality of conductors 4 are deformed into various shapes. Accordingly, the plurality of conductors 4 arranged in the same slot 22 may have different cross-sectional shapes from each other.

In order for the plurality of conductors 4 to be accommodated in the slot 22 with the small gaps as described above, it is preferable that the plurality of conductors 4 in each slot 22 maintain their shapes formed when the plurality of conductors 4 are pressed from the radial opening 22b side. In the present embodiment, in order to prevent the conductors 4 from falling out of the slot 22 from the radial opening 22b, a closing member 25 that closes the radial opening 22b is arranged in the radial opening 22b of the slot 22. Such a member is a so-called wedge. The closing member 25 contacts the outer surfaces in the radial direction R of the circumferential protruding portions 23b formed at the tip ends of the teeth 23, thereby supporting the conductors 4 from inside in the radial direction R. Thus, the width of the closing member 25 in the circumferential direction C is greater than the opening width W2 of the radial opening 22b of the slot 22, and the length of the closing member 25 in the axial direction L is greater than that of the stator core 2 in the axial direction L. The closing member 25 is preferably made of a material having relatively high magnetic resistance and relatively high electrical resistance, such as various synthetic resins. It is also one of preferred embodiments to provide no closing member 25 in the radial opening 22b. In this case as well, the conductor 4 located closest to the radial opening 22b is deformed within the slot 22 so as to have a larger width in the circumferential direction C than the opening width W2 of the radial opening 22b, and serves as the closing member 25. Thus, the plurality of conductors 4 are arranged in the slot 22 while maintaining their shapes formed when the plurality of conductors 4 are pressed from the radial opening 22b side.

As shown in FIG. 1, the plurality of conductors 4 accommodated in one slot 22 protrude from the end in the axial direction L of the stator core 2 and extend in the circumferential direction C so as to be accommodated in another slot 22. In the illustrated example, the stator core 2 has 48 slots 22 distributed in the circumferential direction C, and the number of slots per pole per phase is set to "2." The conductors 4 in one slot 22 are connected to the conductors 4 in another slot 22 located six slots away from the slot 22. Only the parts of the conductors 4 which connect one pair of slots 22 are shown in FIG. 1. Actually, however, the conductors 4 are similarly arranged in all the slots 22 so that the parts of the conductors 4 which protrude in the axial direction L from the stator core 2 extend in the circumferential direction C to connect the slots 22. The coil end portion is formed by the parts of the conductors 4 which protrude from the stator core 2. As used herein, the coil end portion refers to a portion of the coil 3 which protrudes outward in the axial direction L from the stator core 2. Specific arrangement and configuration of the conductors 4 in the coil end portion vary depending on the specific winding method of the coil 3 such as lap winding and wave winding. In the present invention, as described above, the winding method of the coil 3 can be selected as desired.

4. Manufacturing Method of Rotating Electrical Machine

Figure 7:
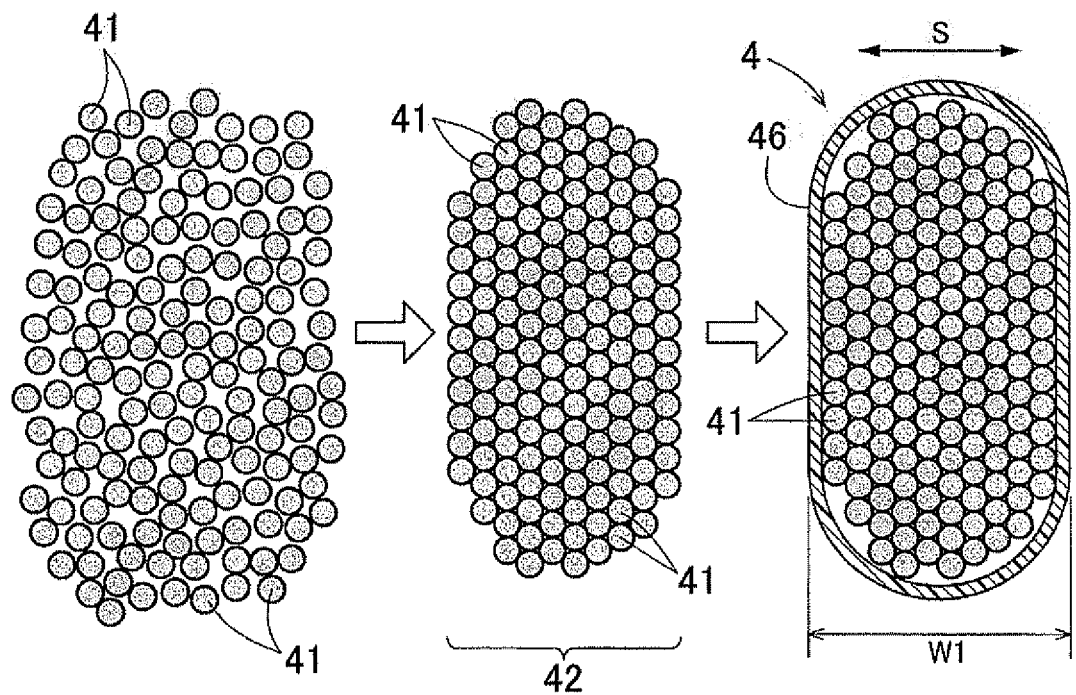
FIG. 7 is a diagram illustrating a manufacturing process of the conductor.
Figure 8:
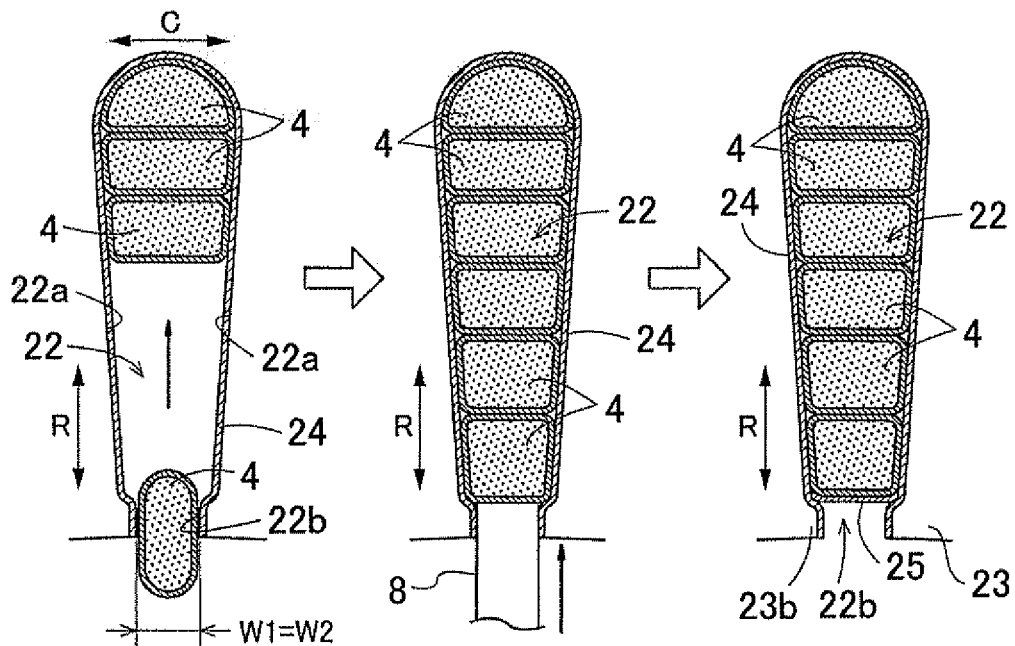
FIG. 8 is a diagram illustrating a manufacturing process of the stator.

The manufacturing method of the rotating electrical machine 100 according to the present embodiment will be described below. FIG. 7 is a diagram sequentially illustrating a manufacturing process of the conductor 4 as a component of the rotating electrical machine 100. FIG. 8 is a diagram sequentially illustrating a manufacturing process of the stator 1 that is manufactured by mounting the conductors 4. Although FIG. 8 shows only one of the plurality of slots 22 in the stator core 2, a similar process is performed on the other slots 22.

First, as shown in the left part of FIG. 7, a predetermined number of conductor wires 41 having a predetermined thickness (cross-sectional area) are prepared. The number of conductor wires 41 is set according to the final thickness (cross-sectional area) of the conductor 4 and the thickness (cross-sectional area) and shape of each conductor wire 41. As shown in the middle part of FIG. 7, the plurality of conductor wires 41 are gathered into a conductor wire bundle 42 so as to have an overall cross-sectional shape other than a true circle along the perpendicular plane P. The overall shape of the conductor wire bundle 42 may be, for example, an ellipse, an elongated circle, a triangle, a quadrangle, etc. That is, the conductor wire bundle 42 is formed such that a circumscribed curve circumscribing the conductor wires 41 of the conductor wire bundle 42 may have a shape other than a true circle, such as an ellipse, an elongated circle, a triangle, or a quadrangle. In the illustrated example, the conductor wire bundle 42 is formed so as to form a circumscribed curve having an elongated circle shape (a race track shape).

Next, as shown in the right part of FIG. 7, the periphery of the conductor wire bundle 42 is covered by an insulating covering material 46 formed by a flexible sheet-like cylindrical material in the present embodiment. At this time, in this example, the insulating covering material 46 has a cross-sectional shape of an elongated circle so as to extend along the outer shape of the conductor wire bundle 42. Such a shape corresponds to the shape formed by pressing and deforming (in this example, flattening) the insulating covering material 46 having a true circle shape from both sides of a predetermined reference direction S in the radial direction of the insulating covering material 46. The conductor 4 thus formed has substantially no such infra-covering gap G as described above inside the insulating covering material 46, and all the conductor wires 41 and the insulating covering material 46 are packed as a whole (a packed state). At this time, in the present embodiment, the width W1 in the reference direction S of the insulating covering material 46 in the packed state is designed so as to match the opening width W2 (see FIGS. 2 and 8) of the radial opening 22b of the slot 22.

Although not shown in the figure, the cross-sectional shape of the insulating covering material 46 is then changed into a true circle, whereby the conductor wires 41 in the packed state are adequately loosened to form the intra-covering gap G radially inward of the insulating covering material 46. This is for the following reason. The sum of the cross-sectional areas of all the conductor wires 41 forming the conductor wire bundle 42 is constant. However, if the periphery of the insulating covering material 46 is constant, the insulating covering material 46 has the largest internal area when the cross-sectional shape of the insulating covering material 46 is a true circle. The cross-sectional shape of the insulating covering material 46 need not necessarily be changed into a true circle, and the conductor 4 may be provided to the manufacturing process of the stator 1 while maintaining its shape shown in the right part of FIG. 7.

Then, as shown in the left part of FIG. 8, a plurality of conductors 4 are inserted into the slot 22. In this example, the plurality of conductors 4 are sequentially inserted one by one from the radial opening 22b. Thus, the conductors 4 are inserted into the slot 22 from the inner side toward the outer side in the radial direction R through the radial opening 22b. In the present embodiment, the outer diameter of the conductor 4 when having a cross-sectional shape of a true circle along the perpendicular plane P (the true circle outer diameter D4) is larger than the opening width W2 of the radial opening 22b of the slot 22 in the circumferential direction C. Accordingly, when inserting the conductor 4 from the radial opening 22b into the slot 22, the cross-sectional shape of the conductor 4 is deformed in advance to make the width of the conductor 4 in the circumferential direction C equal to or less than the opening width W2.

Specifically, in the present embodiment, the conductor 4 is pressed from both sides in the predetermined reference direction S in the radial direction of the conductor 4 to deform (in this example, flatten) the cross-sectional shape of the insulating covering material 46 and the conductor wire bundle 42 located inward thereof into an elongated circle shape. This shape is the same as that in the final stage of the manufacturing process of the conductor 4. Thus, this deformation step can be omitted in the case where the conductor 4 is provided to the manufacturing process of the stator while maintaining its shape in the final stage (in the right part) in FIG. 7. Accordingly, there is substantially no intra-covering gap G inside the insulating covering material 46 (if any intra-covering gap G has been present, such intra-covering gap G is eliminated), and all the conductor wires 41 and the insulating covering material 46 are packed as a whole into a packed state. As described above, in the present embodiment, the width W1 in the reference direction S of the insulating covering material 46 in the packed state (see FIG. 7) is designed so as to match the opening width W2 of the radial opening 22b of the slot 22. Thus, as shown in FIG. 8, the reference direction S serving as the direction in which the conductor 4 is pressed matches the circumferential direction C serving as the width direction of the radial opening 22b, whereby the conductor 4 can pass through the radial opening 22b. Accordingly, the conductor 4 can be appropriately inserted into the slot 22 even if the slot 22 is a semi-open slot.

Moreover, in this case, if the width W1 in the reference direction S of the insulating covering material 46 in the packed state matches the opening width W2 of the radial opening 22b as described above, the intra-covering gap G has the minimum required size. As a result, the size of the intra-covering gap G that allows the cross-sectional shape of the conductor 4 to be deformed freely is not unnecessarily increased, and reduction in the ratio of the area occupied by the coil 3 can be suppressed. That is, both improvement in efficiency of the winding step on the stator core 2 and improvement in the ratio of the area occupied by the coil 3 can be implemented in a balanced manner in the case where the conductor 4 is wound on the stator core 2 having the semi-open slots 22.

Subsequently, as shown in the middle part of FIG. 8, all of the plurality of (in this example, 6) conductors 4 have been inserted in the slot 22, the plurality of conductors 4 are pressed from the radial opening 22b of the slot 22. In this example, a pressing jig 8 is inserted from the radial opening 22b to press the conductors 4 outward in the radial direction R. Thus, the plurality of conductors 4 in the slot 22 are deformed according to the shape of the slot 22, thereby reducing the gap between the inner wall surface 22a of the slot 22 and the conductors 4 and the gap between the plurality of conductors 4. Lastly, as shown in the right part of FIG. 8, the closing member 25 is then inserted into the radial opening 22b of the slot 22. In this example, the closing member 25 is arranged between the surface located closest to the radial opening 22b (innermost in the radial direction R) in the plurality of conductors 4 in the slot 22 and the circumferential protruding portions 23b of the teeth 23. For example, the closing member 25 in a flat plate shape can be inserted in the axial direction L from the axial opening 22c of the slot 22. Arranging the closing member 25 in this manner can prevent the conductors 4 in the slot 22 from falling out of the slot 22 from the radial opening 22b, and also allows the plurality of conductors 4 to be arranged in the slot 22 while maintaining their shapes formed when pressed from the radial opening 22b side. The plurality of conductors 4 thus arranged in the same slot 22 have different cross-sectional shapes from each other.

Although not shown in the figures, the rotating electrical machine 100 is then completed by rotatably mounting the rotor 6 inward of the stator 1 in the radial direction R.

5. Other Embodiments

Lastly, other embodiments of the conductor and the rotating electrical machine according to the present invention will be described below. The configuration disclosed in each of the following embodiments may be combined with any of the configurations disclosed in the other embodiments as long as no consistency arises.

(1) The above embodiment is described using an example in which the difference between the smallest circumscribed circle diameter D1n of the imaginary circumscribed circle CC and the true circle inner diameter D2 of the insulating covering material 46 is equal to or larger than the diameter (the wire diameter D3) of the conductor wires 41. However, embodiments of the present invention are not limited to this. That is, the difference between the smallest circumscribed circle diameter D1n of the imaginary circumscribed circle CC and the true circle inner diameter D2 of the insulating covering material 46 may be less than the wire diameter D3 of the conductor wires 41 as long as the conductor wires 41 can move relative to each other at least in a region radially inward of the insulating covering material 46.

(2) The above embodiment is described using an example in which the conductor wire bundle 42 and the insulating covering material 46 are in the non-bonded state. However, embodiments of the present invention are not limited to this. That is, the conductor wire bundle 42 and the insulating covering material 46 may be in a bonded state. In this case, unlike the above embodiment, the intra-covering materials G are not formed between the conductor wires 41 and the insulating covering material 46, but are formed only between the conductor wires 41. Such a configuration can be implemented by, for example, moving the conductor wire bundle 42 in the extending direction A while supplying an appropriate amount of melted resin material of the insulating covering material 46 to a region around the conductor wire bundle 42. Thus, the inner surface 46a of the insulating covering material 46 is shaped to have concaves and convexes according to the shape of the periphery of the conductor wire bundle 42, whereby the conductor wire bundle 42 and the insulating covering material 46 can be brought into the bonded state. In this case as well, the conductor wires 41 can move relative to each other in the intra-covering gap G formed between the conductor wires 41, and the cross-sectional shape of the conductor 4 can be easily deformed.

(3) The above embodiment is described using an example in which the plurality of conductor wires 41 are twisted and bundled into the single conductor wire bundle 42. However, embodiments of the present invention are not limited to this. That is, the single conductor wire bundle 42 may be formed by bundling the plurality of conductor wires 41 without twisting them.

(4) The above embodiment is described using an example in which each conductor wire 41 has a circular cross-sectional shape along the perpendicular plane P. However, embodiments of the present invention are not limited to this. That is, each conductor wire 41 may have a polygonal cross-sectional shape such as a quadrangle, a triangle, a pentagon, and a hexagon along the perpendicular plane P.

(5) The above embodiment is described using an example in which all of the plurality of conductors 4 are arranged in line in the radial direction R in each slot 22 so that the contact surfaces between adjoining ones of the conductors 4 extends in the circumferential direction C. However, embodiments of the present invention are not limited to this. That is, the cross-sectional shape and arrangement of the conductors 4 in the slot 22 can be determined as appropriate. For example, the plurality of conductors 4 may be arranged in the slot 22 so that the contact surfaces between adjoining ones of the conductors 4 randomly face various directions. Alternatively, the plurality of conductors 4 may be arranged in each slot 22 so that a plurality of columns of the conductors 4, each column extending in the radial direction R, are formed in the circumferential direction C.

(6) The above embodiment is described using an example in which the true circle outer diameter D4 of the conductor 4 is set to be larger than the opening width W2 of the radial opening 22b of the slot 22. However, embodiments of the present invention are not limited to this. That is, the true circle outer diameter D4 of the conductor 4 may be set to a value equal to or less than the opening width W2 of the radial opening 22b of the slot 22.

(7) The above embodiment is described using an example in which the conductor 4 is wound on the stator core 2 having the semi-open slots 22 and the parallel teeth. However, embodiments of the present invention are not limited to this. That is, the slot shape and the tooth shape may be set as appropriate. For example, the conductor 4 may be wound on the stator core 2 having open slots 22. The open slots 22 refer to the slots 22 having no circumferential protruding portion 23b described in the above embodiment and formed so that the width of the radial opening 22b is the same as that of the portion located deeper than the radial opening 22b in the slot 22. Alternatively, the conductor 4 may be wound on the stator core 2 having parallel slots. The parallel slots refer to the slots 22 formed so that two inner wall surfaces 22a facing each other in the circumferential direction C are parallel to each other. The conductor 4 may be wound on a rotor core having slots similar to those described in the above embodiment.

(8) The above embodiment is described using an example in which the conductor according to the present invention is applied to the coil 3 of the inner rotor rotating electrical machine 100. However, applications of the present invention are not limited to this. That is, the conductor according to the present invention may be applied to the coil 3 of an outer rotor rotating electrical machine 100 in which the rotor 6 is disposed outward of the stator 1 in the radial direction R. Alternatively, the conductor according to the present invention may be applied not only to the coil 3 of a radial gap rotating electrical machine 100, but also to the coil 3 of an axial gap rotating electrical machine 100.

(9) Regarding other configurations as well, the embodiments disclosed in the specification are by way of example in all respects, and embodiments of the present invention are not limited to them. That is, the configurations that are not described in the claims can be modified as appropriate without departing from the object of the present invention.

The present invention can be preferably used in conductors for coils of rotating electrical machines, and rotating electrical machines including such conductors.

What is claimed is:

1. A core for a rotating electrical machine, the core being configured with a plurality of semi-open slots in which a width of a slot opening that opens in the radial direction of the core is narrower than a width of a portion of the semi-open slots located deeper than the slot opening of the semi-open slots, the core further comprising:
    a conductor wire bundle formed by gathering a plurality of bare conductor wires without adhesive material between the bare conductor wires; and
    a flexible insulating covering material that covers a periphery of the conductor wire bundle, wherein
    the conductor has an intra-covering gap formed inward of the insulating covering material in a radial direction so that the conductor wires can move relative to each other in the intra-covering gap, and a cross-sectional shape of the insulating covering material along a perpendicular plane that is perpendicular to an extending direction in which the conductor wire bundle extends can be deformed, wherein:
    the conductor is wound on the core,
    the insulating covering material is configured to be deformed by pressing the insulating covering material in the radial direction of the insulating covering material, whereby the intra-covering gap is eliminated and the conductor wires are packed as a whole into a packed state by moving the conductor wires relative to each other in the intra-covering gap in accordance with the deformation of the insulating covering material, and
    a width of the insulating covering material in the packed state is equal to or less than the slot opening width.

2. The core according to claim 1, wherein
    in a cross section along the perpendicular plane, a smallest diameter of an imaginary circumscribed circle circumscribing the conductor wire bundle in which adjoining ones of the conductor wires are in contact with each other is smaller than a true circle inner diameter that is an inner diameter of the insulating covering material deformed to a true circle.

3. The core according to claim 2, wherein
    a difference between the smallest diameter of the imaginary circumscribed circle and the true circle inner diameter of the insulating covering material is equal to or larger than a diameter of the conductor wires.

4. The core according to claim 3, wherein
a perimeter of an inner surface of the insulating covering material is equal to or less than a perimeter of an elongated circle circumscribing the conductor wire bundle having all the conductor wires being arranged in line and in contact with each other.

5. The core according to claim 4, wherein
the width in the radial direction of the insulating covering material in the packed state matches the slot opening width.

6. The core according to claim 5, wherein
the conductor wire bundle and the insulating covering material are in a non-bonded state.

7. The core according to claim 2, wherein
a perimeter of an inner surface of the insulating covering material is equal to or less than a perimeter of an elongated circle circumscribing the conductor wire bundle having all the conductor wires being arranged in line and in contact with each other.

8. The core according to claim 1, wherein
a perimeter of an inner surface of the insulating covering material is equal to or less than a perimeter of an elongated circle circumscribing the conductor wire bundle having all the conductor wires being arranged in line and in contact with each other.

9. The core according to claim 1, wherein
the conductor wire bundle and the insulating covering material are in a non-bonded state.

10. A rotating electrical machine, comprising a core according to claim 1.

11. A rotor core according to the core of claim 1, wherein the semi-open slots open radially outward.

12. A stator core according to the core claim 1, wherein the semi-open slots open radially outward.

13. A stator core according to the core claim 1, wherein the semi-open slots open radially inward.

* * * * *